United States Patent [19]

Fister et al.

[11] Patent Number: 4,871,276

[45] Date of Patent: Oct. 3, 1989

[54] PRELOADED JOINT DEVICE

[75] Inventors: Louis P. Fister, St. Louis, Mo.; Lawrence H. Fitch, Cahokia, Ill.; Herby O. Pearson, Chesterfield, Mo.

[73] Assignee: Moog Automotive, Inc., St. Louis, Mo.

[21] Appl. No.: 273,826

[22] Filed: Nov. 21, 1988

[51] Int. Cl.$^4$ .................................................. F16C 11/06
[52] U.S. Cl. ..................................... 403/162; 403/138; 403/163
[58] Field of Search ................... 285/340; 403/27, 372, 403/132, 138, 162, 163

[56] References Cited

U.S. PATENT DOCUMENTS

| 2,078,212 | 4/1937 | Leighton | 285/340 X |
| 3,365,219 | 1/1968 | Nicolaus | 285/340 |
| 3,779,659 | 12/1973 | Habert | 403/372 |
| 4,163,617 | 8/1979 | Nemoto | 403/132 |
| 4,576,479 | 3/1986 | Smith | 403/27 |

FOREIGN PATENT DOCUMENTS

| 1323319 | 2/1963 | France | 403/133 |
| 1125420 | 8/1968 | United Kingdom | 403/138 |

Primary Examiner—Andrew V. Kundrat
Attorney, Agent, or Firm—Gravely, Lieder & Woodruff

[57] ABSTRACT

A joint device comprising a housing having a bearing for a headed stud, a concave element engaged on the stud head in close fitted position with the internal surface of the housing, and a spun over lip of the housing deforming the concave element on the stud head to exert a desired preload on that stud head while forming its own stop groove in the housing internal surface to prevent lock-up of the headed stud in the housing.

6 Claims, 1 Drawing Sheet

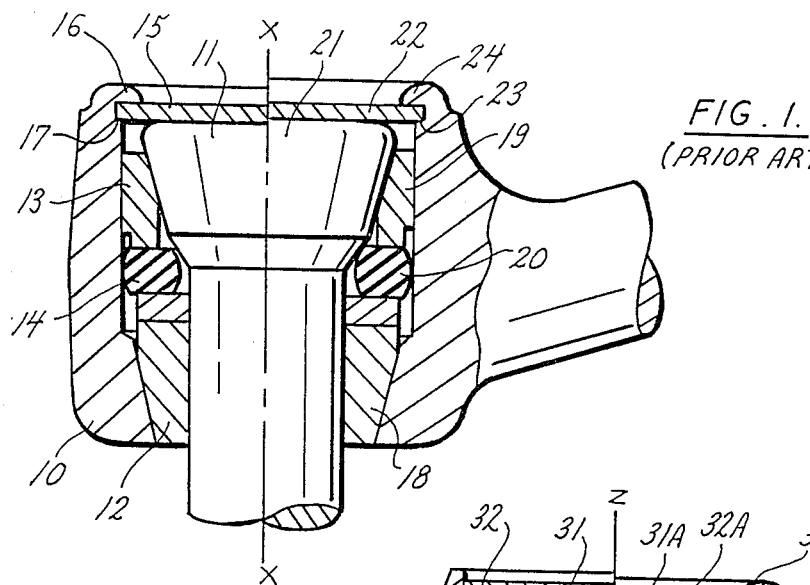
FIG. 1. (PRIOR ART)
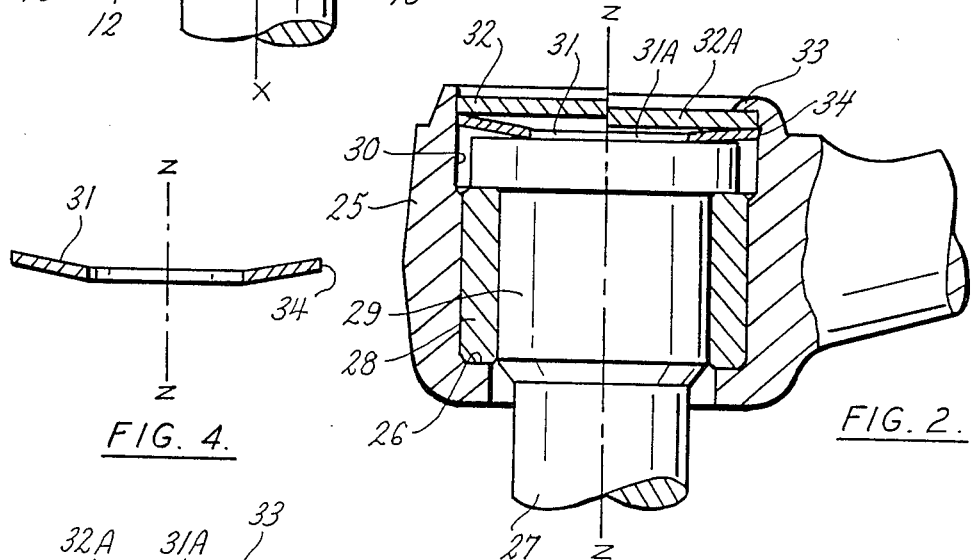
FIG. 2.
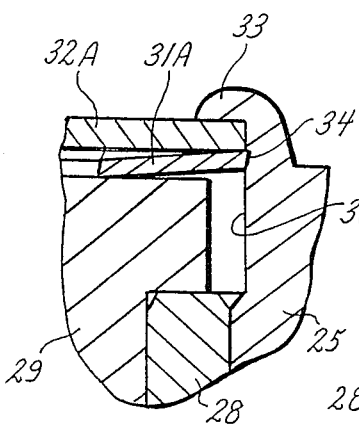
FIG. 4.
FIG. 3.
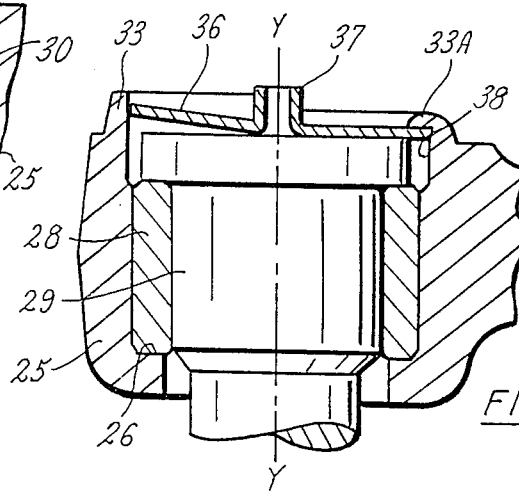
FIG. 5.

PRELOADED JOINT DEVICE

BACKGROUND OF THE INVENTION

1. Field of the Invention

This invention is directed to preloaded joint devices for use in connection with vehicles.

2. Description of the Prior Art

Joint devices of many different constructions and uses are well known, such as those devices used in the automotive field. Since this invention has generally been directed extensively to the field of automotive applications, joint devices in this category are illustrated in such patents as U.S. Pat. Nos. 2,054,082 of Sept. 15, 1936, 3,225,420 of Dec. 28, 1965, 3,395,442 of Aug. 6, 1968, and 4,283,833 of Aug. 18, 1981. These joint devices have a housing for a ball stud, bearing means in the housing, a closure plate and preload means for exerting a desired load in the joint assembly to keep the ball stud reasonably tight for a reasonable period of time.

One of the constructional characteristics of these early ball joints is the provision of wear take-up means which extended the useful life before the ball stud became so worn as to cause it to become dangerously loose in its housing. The wear take-up means is usually sealed into the housing by spinning a housing lip over a cover plate to hold the plate against a shoulder in the housing. The tolerance buildup of the components will determine the amount of preload when the ball joint is new. Other means to determine the amount of preload was devised by radially compressing a housing lip over the cover plate.

Most all of the early ball joint devices were expensive to make, the preload was, in a lot of cases, uncertain, and special equipment was necessary to complete the spinning of the housing lip over the closure plate. Other prior art of interest include U.S. Pat. Nos. 2,815,894 of Dec. 10, 1957 and 4,559,692 of Dec. 24, 1985.

BRIEF SUMMARY OF THE INVENTION

An important characteristic for the ball joint device of this invention is the simplicity of its components which consist of a housing, a headed stud, a cover plate, a bearing and a preloading type modified Belleville washer. It is also possible to combine the cover plate and Belleville washer as a single part. It is not necessary to form an inner positive stop shoulder in the housing. The most important requirement to make the joint device workable is the close clearance between the outside dimension of the modified Belleville washer and the inner dimension of the housing bore which receives the washer. When the washer is deformed into the housing against the headed stud, the flattening of the washer causes its outside dimension to expand and penetrate into the bore so that it forms its own stop shoulder in the housing bore. The advantages of this assembly are that the stud head is prevented from becoming unworkable because of "lock-up", assurance that there will be negligible vertical clearance, and consistent stud head torque.

In its broad aspects the invention resides in a joint device having a housing formed with an internal bore to receive a headed stud and the usual bearing means with the end surface of the headed stud near the open end of the housing bore. A modified Belleville washer of concave form, and with an outside dimension selected to assure a close fit in the housing bore, has its outside rim formed, either by grinding or stamping, to be parallel with the housing bore surface after the thus modified Belleville washer has assumed its normal concave form. That washer is then caused to be flattened against the stud head by flanging the open end of the housing over the washer so its outside rim is caused to expand and penetrate into the surface of the housing bore to create its own stop shoulder which prevents further advance of the Belleville washer with the result that it flattens to establish a desired pre-load. The amount of flatness may be of the order of 0.000 to 0.005 inches from a solid height.

BRIEF DESCRIPTION OF THE DRAWINGS

The accompanying drawings illustrate a comparison of a typical prior art ball joint device with a joint device of this invention, wherein:

FIG. 1 is a vertical section through a prior art ball joint device illustrating two assembly conditions on opposite sides of a median axis;

FIG. 2 a vertical section through the ball joint device of this invention also illustrating two phases of the assembly on opposite sides of a median axis;

FIG. 3 is an enlarged and fragmentary section to illustrate the stop shoulder formed by the Belleville washer in the bore of the housing;

FIG. 4 is a sectional view of the preferred form of the Belleville washer in its relaxed condition and with parallel margins or rim; and FIG. 5 is a vertical section of a modified ball joint showing two phases of the assembly on opposite sides of a median axis.

DETAILED DESCRIPTION OF A PREFERRED EMBODIMENT

FIG. 1 illustrates a typical prior art joint device in which there is shown at the left of the center median axis X—X one form of assembly of the housing 10, the headed stud 11, bearing elements 12 and 13 cooperating with a resilient body 14 and having the usual cover plate 15. The stack of elements is held by spinning over the flange 16 after the cover plate 15 has been installed and set on a pre-formed shoulder 17.

At the right of the median axis X—X a similar arrangement of components includes the bearings 18 and 19 separated by a resilient element 20 for the support of the stud head 21 after the closure plate 22 is placed on the pre-formed shoulder 23 so that the entire assembly of components can be secured by spinning over the flange 24.

The problem with the prior art as illustrated in FIG. 1 is that there is a tolerance variation encountered because of the many components making up the assembly, and as a result the resilient elements 14 or 20 will produce different preloads between the stud head and the housing 10.

Turning now to FIG. 2, there is shown a preloaded joint device of the present invention in which the housing 25 is formed with an internal shoulder 26 adjacent the partially closed end which permits the projection of the shank 27 through the opening. The housing 25 carries a cylindrical bearing 28 for the support of the head 29. The housing 25 is formed with a internal bore 30 adapted to receive a modified resilient Belleville washer 31. The assembly at the left of the median axis Z—Z illustrates the relaxed position of the modified Belleville washer 31 and its closure plate 32. At the right of the median axis Z—Z there is illustrated the preload condition of the Belleville washer 31A and the closure plate 32A which is effected by spinning over the lip 33 of the housing. When spinning the lip 33 of the housing 25, pressure is applied to the closure plate 32A which flattens the Belleville washer 31A and expands the diameter or rim of that washer so that its periphery 34 digs into the bore 30 and forms its own stop out groove or shoulder.

Attention is directed to FIG. 3 where a fragmentary portion of the present joint device is illustrated to more clearly show the formation of the stop out groove 34 in the housing bore 30 when the modified Belleville washer 31A is deformed upon closing the housing 25 by the closure plate 32A during the spinning of the lip 33 over the closure plate 32A.

FIG. 4 illustrates the Belleville washer 31 which has been modified by shaping the peripheral edge 34 so that it becomes substantially parallel tO the vertical axis Z—Z when in the free or relaxed state. When the washer is flattened, the upper corner of the peripheral edge 34 moves radially outwardly more relative to the axis Z—Z than the lower corner of that edge. This physical difference causes the upper corner to penetrate or dig into the bore of the housing 25 to form its own stop groove which is not possible with a normal or conventional Belleville. Upon the formation of the stop groove when the washer is close to its flat position, further loading on the stud head 29 is stopped, thereafter in use when wear takes place the Belleville washer will return toward its relaxed condition and thereby continue to exert its preload effect.

A modified assembly of the present invention is seen in FIG. 5 wherein the housing 25 receives the headed stud 29 and its bearing 28 supported on the surface 26. The open end of the housing is defined by the rim 33, and a modified Belleville washer 36 is placed on top of the stud head with its lubrication fitting socket 37 facing out. This assembly is seen at the left of the median axis Y—Y where the rim of the washer 36 is close to the housing bore 38. After deforming the washer 36 and spinning the rim over to form the retaining lip 33A, the rim of the washer 36 penetrates into the bore of the housing to form its own stop groove.

The important requirement for the present joint device, in order to make it workable as a preloaded joint device, is to have a close clearance between the outside diameter of the washer and the interior diameter of the housing bore. The clearance may be of the order of 0.002 to 0.008 inches. It is this clearance which enables the modified Belleville washer to form its own stop groove in the housing which prevents "lock-up" and assures negligible vertical clearance with consistent torque between the housing and the stud head.

It is understood that the foregoing disclosure of the preload joint device represents a preferred embodiment, but certain modifications may come to mind after a full appreciation of the disclosure is reached.

What is claimed is:

1. In a joint device consisting of a housing having a cylindrical bore therein opening out of the housing at one end and having an opposite end formed with a seat for a headed member operatively mounted in said housing bore and having a stud member extending through said opposite end such that the headed member is supported in said housing on said seat, the improvement of a cover plate fitted onto said one end of said housing, a concavely shaped load exerting resilient element having a rim surface with a diameter which fits in said bore under said cover, and retaining flange means on said housing engaged with said cover for pressing on said cover against said concavely shaped load exerting resilient element thereunder, said load exerting element in its unstressed condition having a peripheral rim surface substantially parallel with said cylindrical bore surface, and in its flattened stressed condition by pressure from said cover reacting such that the rim surface is shaped such that it bites into said bore and forms a stop seat.

2. The improvement in the joint device of claim 1 wherein said substantially close fit between the rim surface of said resilient element and said housing bore is of the order of from 0.002 to 0.008 inches.

3. The improvement in the joint device of claim 1 wherein said resilient element is flattened from its concave shape to substantially 0.000 to 0.005 inches from a solid height.

4. In a joint device having a housing formed with an internal cylindrical bore to receive a headed stud and bearing means operable in the housing and a housing closure means spaced from the headed stud, and adapted to be held in position on the housing, the improvement comprising:

(a) a resilient washer having a normal concave form characterized by an outer peripheral rim the surface of which is substantially parallel with the cylindrical bore; and (b) flange means formed on said housing for advancing said closure means upon said concave washer thereby exerting a predetermined load on said headed stud through reducing the concavity of said washer to force said peripheral rim to expand radially and bite into said cylindrical bore in said housing and form a stop shoulder in said bore to limit the advance of said closure means, said flange means retaining said closure means in position.

5. In a joint device consisting of a housing having a cylindrical internal bore adjacent an open end of the housing and a headed stud member supported in the housing so as to be spaced from the open end, the improvement of (a) a resilient concavo-convex washer disposed in the cylindrical internal bore of said housing to approach the headed stud member, said washer having a rim surface which is substantially parallel with the cylindrical internal wall, said washer presenting its convex side toward said headed stud member with said rim surface closely fitted in said bore; and (b) a securing flange formed on said housing open end to engage and press said concavo-convex shape of said washer against the headed stud member such that said rim surface expands and assumes a non-parallel relation with the internal cylindrical wall of said housing and bites into said wall to form its own stop out shoulder to resist said securing flange means forcing said washer into attaining a solid engagement on said headed stud member.

6. The improvement in the joint device of claim 1 wherein said resilient element is free to act directly upon the stud head to assure a substantially consistent load on said stud head.

* * * * *